United States Patent
Horowitz et al.

(10) Patent No.: US 11,568,153 B2
(45) Date of Patent: Jan. 31, 2023

(54) NARRATIVE EVALUATOR

(71) Applicant: Bank of America Corporation, Charlotte, NC (US)

(72) Inventors: Justin Ryan Horowitz, Fort Mill, SC (US); Manohar Reddy Pilli, Cary, NC (US); Xiaolei Wei, Jersey City, NJ (US)

(73) Assignee: Bank of America Corporation, Charlotte, NC (US)

( * ) Notice: Subject to any disclaimer, the term of this patent is extended or adjusted under 35 U.S.C. 154(b) by 315 days.

(21) Appl. No.: 16/810,263

(22) Filed: Mar. 5, 2020

(65) Prior Publication Data

US 2021/0279425 A1    Sep. 9, 2021

(51) Int. Cl.
| | |
|---|---|
| *G06F 40/44* | (2020.01) |
| *G06F 17/16* | (2006.01) |
| *G06F 9/54* | (2006.01) |
| *G06K 9/62* | (2022.01) |
| *G06N 3/08* | (2006.01) |

(52) U.S. Cl.
CPC .............. *G06F 40/44* (2020.01); *G06F 9/542* (2013.01); *G06F 17/16* (2013.01); *G06K 9/6231* (2013.01); *G06K 9/6251* (2013.01); *G06N 3/08* (2013.01)

(58) Field of Classification Search
CPC .......... G06F 40/44; G06F 9/542; G06F 17/16; G06F 40/30; G06K 9/6231; G06K 9/6251; G06N 3/08; G06N 3/0454; G06V 10/771
See application file for complete search history.

(56) References Cited

U.S. PATENT DOCUMENTS

| | | | |
|---|---|---|---|
| 4,670,848 A | | 6/1987 | Schramm |
| 4,688,195 A | | 8/1987 | Thompson et al. |
| 4,736,296 A | | 4/1988 | Katayama et al. |
| 5,297,039 A | | 3/1994 | Kanaegami et al. |
| 5,321,608 A | | 6/1994 | Namba et al. |
| 6,126,306 A | | 10/2000 | Ando |
| 6,633,846 B1 | | 10/2003 | Bennett et al. |
| 6,687,696 B2 | * | 2/2004 | Hofmann .............. G06F 16/335 |

(Continued)

OTHER PUBLICATIONS

Robert E. Schapire, "The Strength of Weak Learnability," *Machine Learning*, 5, 197-227 (1990).

(Continued)

*Primary Examiner* — Michael N Opsasnick

(57) ABSTRACT

A system includes a narrative repository which stores a plurality of narratives and, for each narrative, a corresponding outcome. A narrative evaluator receives the plurality of narratives and the outcome for each narrative. For each received narrative, a subset of the narrative is determined to retain based on rules. For each determined subset, a entropy matrix is determined which includes, for each word in the subset, a measure associated with whether the word is expected to appear in a sentence with another word in the subset. For each entropy matrix, a distance matrix is determined which includes, for each word in the subset, a numerical representation of a difference in meaning of the word and another word. Using one or more distance matrix (es), a first threshold distance is determined for a first word of the subset. The first word and first threshold are stored as a first word-threshold pair associated with the first outcome.

20 Claims, 8 Drawing Sheets

(56) References Cited

U.S. PATENT DOCUMENTS

| | | |
|---|---|---|
| 6,810,375 B1 | 10/2004 | Ejerhed |
| 6,879,956 B1 | 4/2005 | Honda et al. |
| 6,952,666 B1 | 10/2005 | Weise |
| 7,024,408 B2 | 4/2006 | Dehlinger et al. |
| 7,143,036 B2 | 11/2006 | Weise |
| 7,319,952 B2 | 1/2008 | Weise |
| 7,376,556 B2 | 5/2008 | Bennett |
| 7,379,946 B2 | 5/2008 | Carus et al. |
| 7,386,438 B1 | 6/2008 | Franz et al. |
| 7,409,337 B1 | 8/2008 | Potter et al. |
| 7,437,295 B2 | 10/2008 | Pitts, III et al. |
| 7,475,010 B2 | 1/2009 | Chao |
| 7,610,188 B2 | 10/2009 | Weise |
| 7,672,841 B2 | 3/2010 | Bennett |
| 7,725,307 B2 | 5/2010 | Bennett |
| 7,974,833 B2 | 7/2011 | Soricut et al. |
| 8,463,594 B2 | 6/2013 | Au |
| 8,527,262 B2 | 9/2013 | Kambhatla et al. |
| 8,943,094 B2 | 1/2015 | Brown et al. |
| 9,171,541 B2 | 10/2015 | Kennewick et al. |
| 9,225,833 B1* | 12/2015 | Koster ............. H04M 3/42221 |
| 10,127,214 B2 | 11/2018 | Munro et al. |
| 10,169,329 B2 | 1/2019 | Futrell et al. |
| 10,346,540 B2 | 7/2019 | Karov et al. |
| 2002/0042793 A1* | 4/2002 | Choi ..................... G06F 16/353 |
| 2010/0185685 A1* | 7/2010 | Chew .................... G06F 16/334 |
| | | 707/E17.015 |
| 2010/0235341 A1 | 9/2010 | Bennett |
| 2011/0295903 A1* | 12/2011 | Chen .................... G06F 16/367 |
| | | 707/794 |
| 2012/0016878 A1* | 1/2012 | Peng .................... G06K 9/6239 |
| | | 707/E17.046 |
| 2015/0340033 A1 | 11/2015 | DiFabbrizio et al. |
| 2018/0165554 A1* | 6/2018 | Zhang .................... G06N 3/084 |

OTHER PUBLICATIONS

Jeffrey Pennington, Richard Socher, and Christopher D. Manning, "GloVe: Global Vectors for Word Representation," *Proceedings of 2014 Conference on Empirical Methods in Natural Language Processing* (EMNLP) 2014.

Rudi L. Cilibrasi and Paul M. B. Vitanyi, "The Google Similarity Distance," *IEEE Transactions on Knowledge and Data Engineering*, vol. 19, No. 3, Mar. 2007, 370-383.

Tianqi Chen, Sameer Singh, Ben Taskar, and Carlos Guestrin, Efficient Second-Order Gradient Boosting for Conditional Random Fields, *Proceedings of the 18th International Conference on Artifical Intelligence and Statistics (AISTATS)*, 201, San Diego, CA, USA. JMLR: W&CP vol. 38, 2015.

Fan Zhang, Bo Du, and Liangpei Zhang, Scene Classification via a Gradient Boosting Random Convolutional Network Framework, *IEEE Transactions on Geoscience and Remote Sensing*, vol. 54, No. 3, Mar. 2016.

Tianqi Chen and Carlos Guestrin, "XGBoost: A Scalable Tree Boosting System," *Proceedings of the 22nd ACM SIGKDD International Conference on Knowledge Discovery and Data Mining ACM 2016*, KDD '16, Aug. 13-17, 2016, San Francisco, CA, USA.

Paul M. B. Vitanyi, "Exact Expression for Information Distance," *IEEE Transactions on Information Theory*, vol. 63, No. 8, Aug. 2017.

* cited by examiner

| Brother | |
|---|---|
| Distance | Word |
| 0.086634 | she |
| 0.095569 | took |
| 0.105539 | having |
| 0.108655 | could |
| 0.113468 | explained |
| 0.113548 | and |
| 0.113568 | as |
| 0.114617 | not |
| 0.119493 | received |
| 0.121308 | exactly |
| 0.121521 | to |
| 0.12186 | the |
| 0.12488 | confirmed |
| 0.133316 | by |
| 0.143882 | union |
| 0.162524 | investigations |
| 0.181637 | louisiana |
| 0.186506 | misconduct |
| 0.221275 | visa |
| 0.239103 | olb |

FIG. 3A

| Hospital | |
|---|---|
| Distance | Word |
| 0.117162 | she |
| 0.135413 | took |
| 0.137994 | could |
| 0.141168 | having |
| 0.141433 | union |
| 0.141455 | received |
| 0.141636 | confirmed |
| 0.143825 | as |
| 0.144862 | not |
| 0.145104 | to |
| 0.146109 | explained |
| 0.146935 | investigations |
| 0.147139 | and |
| 0.14809 | the |
| 0.153937 | exactly |
| 0.154215 | louisiana |
| 0.161733 | by |
| 0.1692 | misconduct |
| 0.212233 | visa |
| 0.263944 | olb |

FIG. 3B

| Running | |
|---|---|
| Distance | Word |
| 0.082349 | having |
| 0.084628 | took |
| 0.084909 | could |
| 0.085294 | not |
| 0.086949 | exactly |
| 0.088779 | the |
| 0.088978 | as |
| 0.09142 | and |
| 0.095232 | to |
| 0.106352 | explained |
| 0.112044 | received |
| 0.113263 | she |
| 0.116208 | confirmed |
| 0.118352 | by |
| 0.148441 | union |
| 0.149134 | investigations |
| 0.181554 | louisiana |
| 0.191095 | misconduct |
| 0.228551 | visa |
| 0.233231 | olb |

FIG. 3C

| Hospital | |
|---|---|
| Distance | Word |
| 0.083117 | care |
| 0.120078 | after |
| 0.121284 | house |
| 0.127477 | assisted |
| 0.129057 | who |
| 0.129443 | had |
| 0.132285 | when |
| 0.132612 | was |
| 0.133307 | needs |
| 0.134207 | local |
| 0.13556 | taken |
| 0.135976 | because |
| 0.137063 | advised |
| 0.137075 | in |
| 0.137154 | came |
| 0.13743 | they |
| 0.137691 | asked |
| 0.138693 | did |
| 0.138727 | company |
| 0.139288 | one |

- "client james w ng called in on on 10 / 01 / 2017 stating they had an issue with their television and the television pop up came up and stated to call this company soft solution / t edmonton ab to have the issue fixed / client advised that they fix the computer , but it looks as though they may have issues with people scamming them , when asking about other activity like freedompop , client wasn ' t to sure what that was for either . asked client james if they have anyone in the house hold helping them with finances , client confirmed no just themselves in the house hold . although this first merchant who did fix their television , i feel like the customer needs to be taken care of if no one is in the house hold with them because they confirmed they do a lot of mistakes like these after informing client that they may want to just take to local television company instead of calling numbers that they don ' t know are to be legit , assisted client with replacing their credit card ."

- '", 'what', 'because', 'assisted', 'like', '""', 'with', 'local', 'feel', '10', 'as', 'asked', 'mistakes', 'want', 'w', 'customer', 'this', 'legit', 'and', 'on', 'though', 'they', 'hold', 'called', 'was', 'just', ';', 'calling', 'instead', 'that', 'solution', 'care', 'about', 'for', '2017', 'television', 'when', 'numbers', 'either', 'came', 'their', 'know', 'take', 'issue', 'confirmed', 'had', 'issues', 'ng', 'these', 'house', 'of', 'first', 'freedompop', 't', 'a', 'activity', 'informing', 'company', 'pop', 'people', 'have', 'replacing', 'did', 'wasn', 'merchant', 'to', 'an', 'although', '01', 'do', 'it', 'call', 'but', 'are', 'anyone', 'may', ':', 'credit', 'one', 'i', 'taken', 'client', 'soft', 'after', 'card', 'looks', 'lot', 'fixed', 'fix', 'needs', 'finances', 'edmonton', 'scamming', 'them', '/', 'helping', 'who', 'if', 'stating', 'computer', 'themselves', 'don', 'the', 'is', 'stated', 'james', 'advised', 'no', 'in', 'ab', 'be', 'asking', 'sure', 'other', 'up'

FIG. 4

NARRATIVE EVALUATOR

TECHNICAL FIELD

The present disclosure relates generally to evaluating natural language text. More particularly, in certain embodiments, the present disclosure is related to a narrative evaluator.

BACKGROUND

In some cases, written narratives are generated by individuals such as employees or service providers. These narratives are generally reviewed to determine if further action is needed. For instance, a service provider may prepare a narrative describing an interaction with a client. An administrator may review the narrative to determine if the narrative describes an event affecting the wellbeing of the client. In some cases, an entity may employ many such service providers, resulting in the creation of many narratives. A need exists for improved approaches to identifying narratives which warrant further corrective measures such as reporting to appropriate authorities.

SUMMARY

In an embodiment, a system includes a narrative repository configured to store a plurality of narratives and, for each narrative, a corresponding outcome. Each narrative includes a natural language description of characteristics associated with an event. The corresponding outcome for each narrative comprises an indication of whether the event was unapproved and required reporting to an administrative entity. The system includes a narrative evaluator communicatively coupled to the narrative repository. The narrative evaluator includes a processor configured to receive the plurality of narratives and the outcome for each narrative. For each received narrative, a subset of the narrative is determined to retain based on predefined rules. The predefined rules identify information to exclude from the narrative. For each determined subset, a factorized entropy matrix is determined which includes for each word in the subset a set of numbers. Each number is associated with a count of co-occurrences of the word with another word in the natural language. For each factorized entropy matrix, an entropy matrix is determined by multiplying the factorized entropy matrix by the transpose of the factorized entropy matrix. The entropy matrix includes, for each word in the subset, a measure associated with whether the word is expected to appear in a sentence with another word in the subset. For each entropy matrix, a distance matrix is determined by normalizing the entropy matrix using a partitioning coefficient (e.g., and diagonal terms of the entropy matrix). The distance matrix includes, for each word in the subset, a numerical representation of a difference in the meaning of the word and another word. Using at least one of the distance matrices, a first threshold distance is determined for a first word of the subset. When a first narrative-to-word distance determined between a first narrative and the first word is less than the threshold distance, text in the first narrative is determined to be associated with a first outcome corresponding to an occurrence of an unapproved event. The first narrative-to-word difference corresponds to a smallest difference between a meaning of the first word and a meaning of any word in the first narrative. The first word and first threshold are stored as a first word-threshold pair associated with the first outcome.

Individuals can prepare written narratives to describe events, and the narratives are subsequently reviewed by an appropriately trained person to determine if the described events may be unapproved (e.g., may be associated with violation of a statute, law, or the like). For instance, a narrative may include a natural language (e.g., English or the like) description of an interaction between individuals (e.g., a service provider and a client). For example, narratives may be used to identify whether activities, individuals, and/or events described in the narratives are associated with some unapproved event. For instance, a service provider may prepare a narrative describing a transaction with a client, and the narrative may be reviewed to determine whether the client may be subject to some form of abuse/harm/non-statutory, or illegal conduct, or the like. In many cases, narratives may be generated at such a rapid pace (e.g., from multiple sources) that it is impossible for each narrative to be reviewed by an appropriately trained individual within a time frame that allows appropriate actions to be taken. For example, if a statute is violated (e.g., related to harm to an elderly person), the service provider may be required by law to report this harm within a limited time frame. As such, using previous technology, many narratives are not reviewed, and unapproved activities described in these narratives go undetected.

This disclosure encompasses the recognition of previously unidentified problems associated with previous technology used to review natural language narratives and facilitates the reliable and automatic identification of narratives associated with a predetermined (e.g., unapproved) activity and/or event. Previous technology largely relied on the identification of keywords that are likely to appear in a sentence related to an unapproved event, while failing to account for the broader context of the meaning of words in the narratives or the narratives as a whole. As such, previous technology provided results with a high frequency of false positives, such that automatic alerts could not be reliably provided. This disclosure encompasses the recognition of these shortcomings of previous technology and provides an approach to detecting narratives associated with predefined (e.g., unapproved) events based on unique normalized "distances" which represent the differences in meanings between words and/or between narratives and individual words.

Certain embodiments of this disclosure provide unique solutions to the newly recognized problems described above and other technical problems by facilitating the determination of normalized distances and the use of these distances to establish unique criteria for detecting narratives associated with predefined (e.g., unapproved) events. For example, the disclosed system provides several technical advantages which include 1) the automatic and high-throughput determination of a new measure (i.e., normalized distances) which facilitate computationally efficient representations of differences in the meanings of words; 2) the reliable detection of narratives describing predefined events of interest (e.g., events that are unapproved, such as events linked to violating a statute or the like); and 3) the generation of alerts (e.g., in the form of appropriately formatted reports) when a narrative is determined to be associated with such an event. As such, this disclosure may improve the function of computer systems used to review natural language text and identify whether the text describes one or more events of interest. For example, the system described in this disclosure may decrease processing resource required to review the natural language text by identifying word-threshold pairs which can be used to more efficiently determine whether the text describes an event of interest. The system may also or alternatively reduce or eliminate practical and technical barriers to reviewing large numbers of narratives by reducing or eliminating reliance on previous processing-intensive approaches and substantially reducing the number of false-positive identifications, which otherwise could not be reviewed, resulting in many failed identifications of these events. The system described in this disclosure may particularly be integrated into a practical application for evaluating natural language narratives related to the characteristics of an interaction between a client and a service provider and the identification of any suspicious aspects of this interaction (e.g., suggesting that the client may be the target of some bad actor, e.g., that the individual has been coerced to participate in an activity against his/her wishes, etc.). Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIGS. 3A, 3B, and 3C illustrate example word-to-word distances of FIG. 2A;

FIG. 4 illustrates example narrative-to-word distances of FIG. 2A;

DETAILED DESCRIPTION

Figure 1:
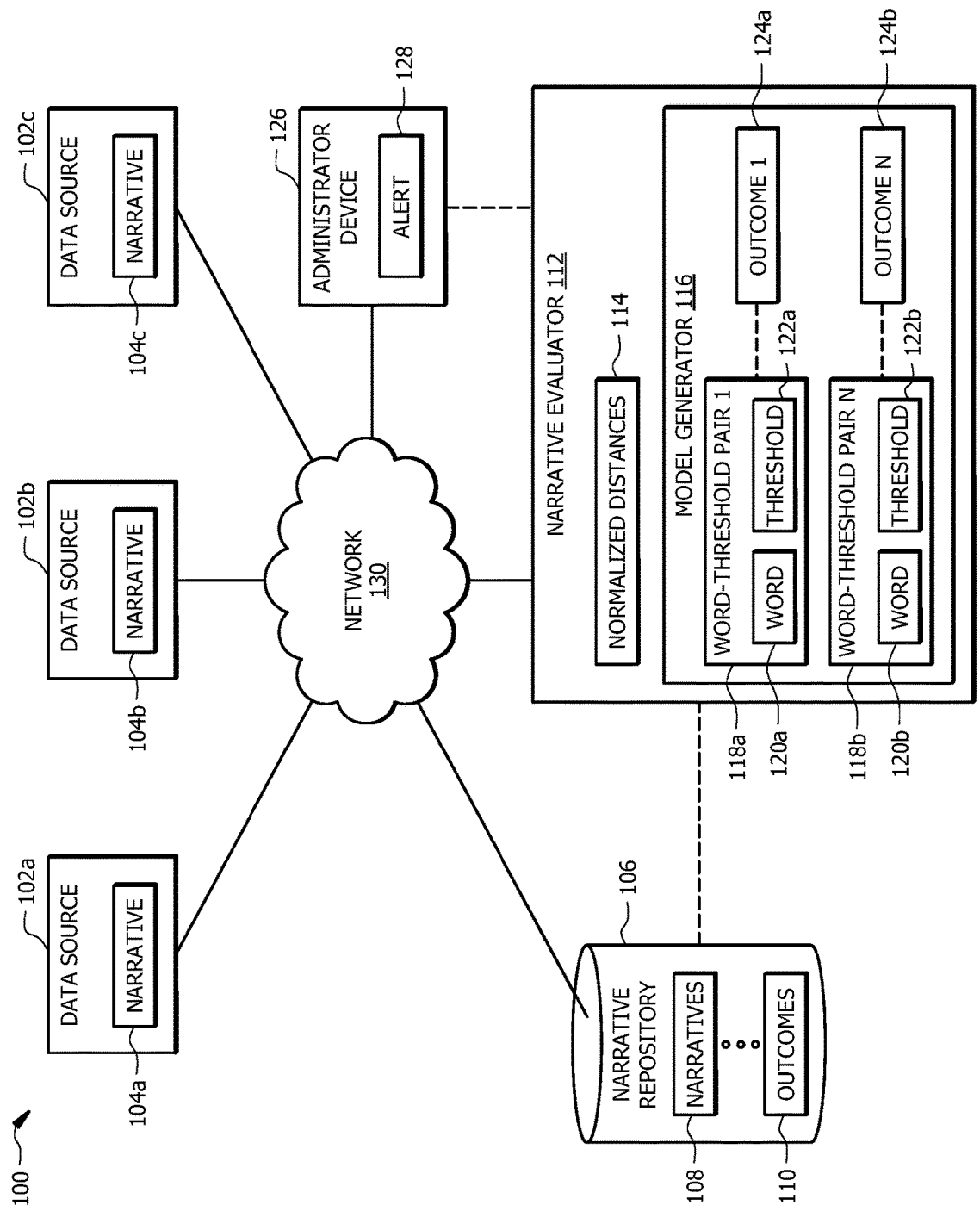
FIG. 1 is a schematic diagram of an example system for evaluating narratives, according to an illustrative embodiment of this disclosure.

As described above, prior to this disclosure, there was a lack of tools for reliably reviewing natural language narratives and identifying any issues likely to be associated with the narratives. In some cases, tens of thousands of narratives may need to be reviewed (e.g., narratives 104a-c described with respect to FIG. 1 below) each year. Prior to this disclosure, it was impossible to reliably review these narratives and identify any that describe unapproved events. Conventional tools for reviewing text (e.g., for natural language processing) fail to provide reliable insight into whether a given narrative is likely to be associated with an unapproved event. Previous approaches particularly fail to capture the meaning (e.g., definitions) of words. Instead, the information provided by previous technology is generally limited to the frequency with which words tend to appear together in examples of natural language (e.g., obtained from collections of example sentences). As an example, conventional approaches may incorrectly determine that the word "the" is more closely related to the word "oatmeal" than is the word "haggis" (e.g., because the words "the" and "oatmeal" appear together in many sentences, while the words "haggis" and "oatmeal" appear together relatively infrequently). This determination does not reflect the meanings of these words, because haggis is a food product which contains oatmeal, while haggis does not include the definite article "the." An approach which captures the meanings of words, such as is described in this disclosure, would reflect that the word "oatmeal" is more closely related to the word "haggis" than it is to the word "the."

As described with respect to the examples of FIGS. 1-7 below, the shortcomings of previous technology may be overcome using a unique narrative evaluator, which accounts for the similarity of word meanings in order to identify narratives associated with predefined events (e.g., with unapproved events). As such, rather than merely determining whether words are likely to appear together in a sentence, a new normalized distance is determined, which describes the extent to which words are similar, related, and/or overlapping in meaning. These normalized distances are used to establish criteria for more reliably detecting narratives associated with unapproved events than was previously possible. For instance, in certain embodiments, this disclosure facilitates the efficient generation and maintenance of a model to review a new natural language narrative, automatically detect or screen for a predefined event or outcome associated with the narrative, and provide an appropriate alert related to further actions to take for the detected outcome. As such, this disclosure provides technical advantages over previously available technology by providing an approach to reviewing natural language narratives that is both more efficient (e.g., in terms of the use of memory and processing resources) and reliably (e.g., by providing more accurate results).

System for Evaluating Natural Language Narratives

FIG. 1 is a schematic diagram of an example system 100 for evaluating natural language narratives 104a-c. As used in this disclosure, a natural language corresponds to a an established language (e.g., English) used for human-to-human communication. System 100 achieves this via the determination of normalized distances 114 based on a record of narratives 108 and uses the normalized distances 114 to identify appropriate word-threshold pairs 118a,b for detecting descriptions of unapproved events in received narratives 104a-c. System 100 includes data sources 102a-c, a narrative repository 106, a narrative evaluator 112, an administrator device 126, and a network 130. As described in greater detail below, the narrative evaluator 112 generally facilitates the automatic detection of narratives 104a-c associated with a predefined outcome 124a,b (e.g., an outcome 124a,b associated with an unapproved event) and the subsequent provision of a properly formatted alert 128 for further review and/or action. As an example, the narrative evaluator 112 may determine that a given narrative 104a-c includes a description associated with a predefined outcome 124a,b that is known to be associated with to an event that is unapproved (e.g., that broke a known statute, was illegal, was linked to some harm to an individual, or the like). If such a determination is made, the narrative evaluator 112 may automatically provide an alert 128 which includes information about the predefined outcome 124a,b and the narrative 104a-c for which it was detected. For instance, the alert 128 may identify a type of unapproved event suspected to have occurred, a data source 102a-c at which the narrative 104a-c was received, and the like. The information provided in the alert 128 may facilitate timely action to report and/or correct the unapproved event.

The data sources 102*a-c* are generally sources (e.g., data repositories, computing devices, etc.) of narratives 104*a-c*. Data source 102*a-c* are operable to receive, store, and/or transmit corresponding narratives 104*a-c*. A narrative 104*a-c* is generally a text entry in a natural language. For instance, a narrative 104*a-c* may be a natural language description of characteristics of an event, such as an interaction between two individuals, an interaction between a service provider and a client, a financial transaction, or the like. The data sources 102*a-c* are generally configured to provide the narratives 104*a-c* to the narrative repository 106 and/or the narrative evaluator 112. In some embodiments, each of the data sources 102*a-c* may be associated with a unique entity. For example, data source 102*a* may be associated with an individual business (e.g., such that narratives 104*a* include information about transactions at a store), data source 102*b* may be associated with an individual (e.g., such that narrative 104*b* may include information about clients associated with the individual, for example, from a client profile), and data source 102*c* may be associated with groups of entities (e.g., such that narrative 104*c* includes information about interactions with the group). Each of the data sources 102*a-c* may be located in a different geographical location. While three data sources 102*a-c* are depicted in the example of FIG. 1, it should be understood that system 100 may include anywhere from one to hundreds, thousands, or more data sources 102*a-c*. Each of the data sources 102*a-c* may be implemented using the hardware, memory, and interfaces of device 700 described with respect to FIG. 7 below.

The narrative repository 106 is generally a data store, or database, configured to store narratives 108 and associated outcomes 110. Like narratives 104*a-c*, each narrative 108 generally includes a natural language description of an event. Each narrative 110 may be associated with a corresponding outcome 110. The outcome 110 for each narrative 108 is generally an indication of whether the narrative 108 was determined to be associated with (e.g., to describe) an unapproved event. For instance, an outcome 110 may indicate whether the corresponding narrative 108 was found to be associated with a statute being violated, a law being violated, another form of malfeasance, or any other event indicating further reporting and/or action should be taken (e.g., providing an alert 128, filing a report to an administrative body, alerting an administrator, contacting a protective and/or enforcement agency, or the like). In other words, the outcome 110 generally corresponds to whether some issue was identified in the narrative 108 indicating that the event described in the narrative 108 may be unapproved (e.g., malicious, inappropriate, or the like). As an example, an outcome 108 of a narrative 110 may indicate that the event is not unapproved, such that further action was not taken after the narrative 108 was reviewed (e.g., whether the narrative 108 was reviewed by a human or the narrative evaluator 112). For instance, if an administrator read the narrative 108 and determined that the event described in the narrative 108 was not unapproved, the outcome 110 includes an indication that the narrative is not unapproved. In some embodiments, narratives 108 with outcomes 110 that are not associated with an unapproved event are not retained in the narrative repository 106. As another example, an outcome 110 may indicate that the event described in the corresponding narrative 108 was unapproved (e.g., such that an alert 128, described in greater detail below, was provided following review of the narrative 110). An outcome 110 may indicate that the corresponding narrative 108 was flagged for further review. An outcome 110 may include an indication of a severity level of an alert 128 provided for the narrative 108. For instance, the outcome 108 may include a ranking of low, medium, high, or the like, indicating immediacy with which action should be taken in response to the narrative 108.

Generally, the narratives 108 may include narratives 104*a-c* along with other narratives 108 received from other data sources (not shown) and/or narratives 108 received previously from data sources 102*a-c*. As such, the narrative repository 106 may store a record of narratives 108 and the associated outcomes 110 over a period of time. This record of narratives 108 and outcomes 110 may be used to train the narrative evaluator 112, as described in greater detail below with respect to FIGS. 2-5. The narrative repository 106 may be implemented using the hardware, memory, and interface of device 700 described with respect to FIG. 7 below.

The narrative evaluator 112 may be any computing device, or collection of computing devices, configured to receive narratives 108 and associated outcomes 110 from the narrative repository 106 and determine normalized distances 114. As described in greater detail below with respect of FIGS. 2-5, the normalized distances 114 include numerical scores indicating the "distance" or difference in meaning between different words appearing in the narratives 108. Normalized distances 114 are described in greater detail below with respect to FIGS. 2-5. FIGS. 3A-C particularly illustrate examples of example normalized word-to-word distances. FIG. 4 illustrates a narrative-to-word distance. The normalized distances 114 may include such distances. The narrative evaluator 112 is at least in communication (e.g., via network 130 as shown by the solid lines in FIG. 1, or via any other appropriate means, as shown by the dashed lines in FIG. 1) with the narrative repository 106 and the administrator device 126. However, the narrative evaluator 112 may also be in communication, via the network 130, with the data sources 102*a-c*. The narrative evaluator 112 may be implemented using the hardware, memory, and interface of device 700 described with respect to FIG. 7 below. In some embodiments, the narrative evaluator 112 may be implemented on the administrator device 126 (e.g., using appropriate instructions stored in a memory of the administrator device 126 and executed by a processor of the device 126). In other embodiments, the narrative evaluator 112 may be implemented using a separate device, or a collection of computing devices (e.g., configured as a server).

The narrative evaluator 112 may include a model generator 116, which is configured to use the unique normalized distances 114 determined by narrative evaluator 112 and the outcomes 110 from the narrative repository 106 to determine particular word-threshold pairs 118*a,b* that are linked to corresponding predefined outcomes 124*a,b*. Each word-threshold pair 118*a,b* includes a word 120*a,b* and a threshold value 122*a,b*. As described in greater detail with respect to FIG. 6, these word-threshold pairs 118*a,b* may be used to evaluate a received narrative 104*a-c* (e.g., received from a data source 102*a-c* or received via the narrative repository 106) and determine whether an alert 128 should be provided to the administrator device 126 and what information the alert 128 should include. As an example, an alert 128 may include an automatically generated indication that the event was unapproved. In some embodiments, the alert 128 may be formatted as a natural language report which can be provided to an administrator (e.g., an administrator of associated with overseeing the data sources 102*a-c*, a protective and/or enforcement agency associated with protecting clients of the data sources 102a-c and/or enforcing rules for the data sources 102a-c).

The administrator device 126 is generally any computing device operable to receive an alert 128 and provide the alert 128 for display (e.g., on an interface of the device 126). The administrator device 126 is in communication with the narrative evaluator 112 (e.g., via the network 130 as illustrated by the solid lines in FIG. 1 or via any appropriate means as illustrated by the dashed lines in FIG. 1). As described above, in some embodiments, the administrator device 126 is configured to implement function(s) of the narrative evaluator 112 (e.g., appropriate instructions may be stored in a memory of the administrator device 126 and executed by a processor of the device 126 to implement functions of the narrative evaluator 112). The administrator device 126 may be operated by any appropriate administrator associated with the data sources 102a-c. The administrator device 126 may be implemented using the hardware, memory, and interface of device 700 described with respect to FIG. 7 below.

In an example operation of the system 100, the narrative evaluator 112 receives a record of previous narratives 108 from the narrative repository 106. The narrative evaluator 112 uses the narratives 108 to determine normalized distances 114, which provide a measure of the differences (i.e., as a numerical value) in meanings (e.g., definitions, e.g., overlap in meaning) of the words appearing in the narratives 108. The model generator 116 may use the narratives 108, the outcomes 110, and these unique normalized distances 114 to identify a word-threshold pairs 118a,b associated with corresponding predefined outcomes 124a,b. In general, the word-threshold pairs 118a,b can be used to determine if a narrative 104a-c is associated with one or more of the predefined outcomes 124a,b. Each word-threshold pair 118a,b includes a word 120a,b and a threshold value 122a,b. In some embodiments, a narrative 104a-c which is found to have a narrative-to-word distance value (e.g., distance 224 of FIG. 2 described below) between the narrative 104a-c and the word 120a,b is determined to be associated with the corresponding outcome 124a,b. In some embodiments, the narrative evaluator 112 may use weighted combinations of multiple word-threshold pairs 118a,b to determine whether certain outcomes 124a,b are associated with a given narrative 104a-c (see FIG. 2A and corresponding description below). Operation of the narrative evaluator 12 and model generator 116 is described in greater detail below with respect to FIGS. 2-5.

Following determination of the word-threshold pairs 118a,b, the narrative evaluator 112 may determine whether a new narrative 104a-c provided by a data source 102a-c is likely associated with an unapproved event. In other words, the narrative evaluator 112 determines whether one or more words in the new narrative 104a-c satisfies criteria associated with word-threshold pairs 118a,b. For instance, if the new narrative 104a-c includes the word 120a,b with a distance 114 that is less than the threshold distance 122a,b, the narrative evaluator 112 may determine that the narrative 104a-c is associated with the corresponding outcome 124a,b. In some cases, a weighted combination of the word-threshold pairs 118a,b may be used to determine whether a the narrative 104a-c is associated with one or both of the outcomes 124a,b. If an outcome 124a,b indicating the event described in the narrative 104a-c indicates that the event is unapproved, the narrative evaluator 112 may provide the alert 128 to the administrator device 126. Determination of whether a narrative 104a-c is associated with an outcome 124a,b is described in greater detail below with respect to FIG. 6.

Model Generator

Figure 2A:
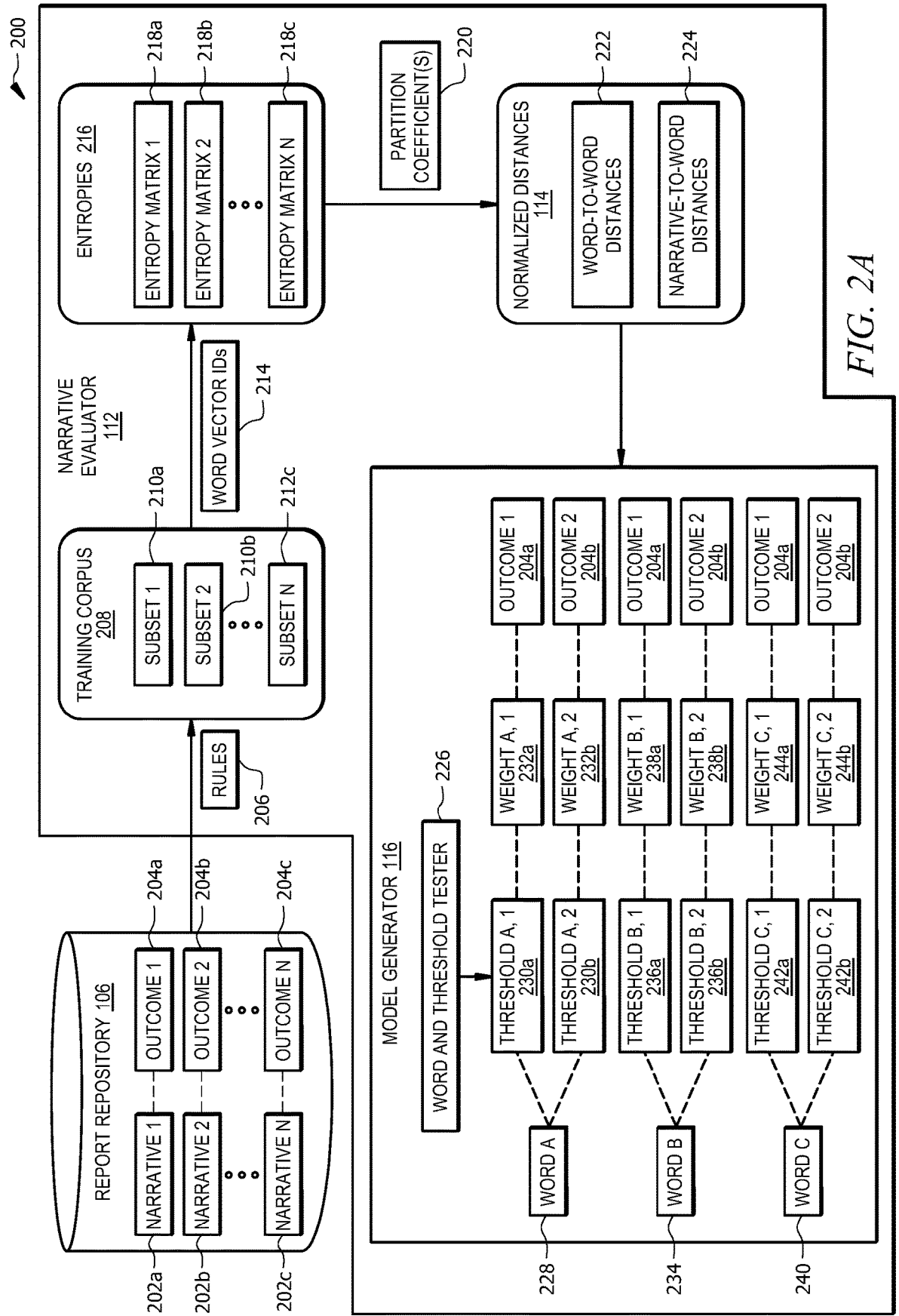
FIG. 2A is a flow diagram illustrating an example operation of the narrative evaluator and model generator of the system illustrated in FIG. 1.

FIG. 2A is a flow diagram 200 illustrating operation of the model generator 116 of the narrative evaluator 112 shown in FIG. 1. As shown in FIG. 2A, the narrative evaluator 112 may receive a plurality of narratives 202a-c and the corresponding outcomes 204a-c from the narrative repository 106. Narratives 202a-c may be included in the narratives 108 of FIG. 1, and outcomes 204a-c may be included in the outcomes 110 of FIG. 1.

The narrative evaluator 112 may use a set of rules 206 to determine a training corpus 208 to retain from the narratives 202a-c. The training corpus 208 generally includes subsets 210a-c of the narratives 202a-c. Each subset 210a-c generally includes a portion of the corresponding original narrative 202a-c. The rules 206 generally identify words and/or other information to include from the narratives 202a-c to include in the subsets 210a-c. For instance, the rules 206 may indicate that proper names, addresses, personal identifiable information, and/or the like should be removed from the narratives 202a-c to determine the subsets 210a-c (i.e., such that each subset 210a-c is the corresponding narrative 202a-c with this information removed).

A set of word vector IDs 214 is used to convert the training corpus 208, which includes subsets 210a-c of the text from the narratives 202a-c, to entropies 216. Entropies 216 generally include measures of an uncertainty of possible outcomes of a variable (e.g., uncertainties of the co-occurrence of words in a natural language sentence). The entropy (S) of two words, word x and word y, co-occurring in a sentence may be used to determine a probability (p) of the words occurring together in a sentence based on:

$$p(x \text{ and } y \text{ together}) = e^{w_x \cdot w_y} - k$$

where $w_x$ is the portion of the initial factorized entropy matrix associated with matrix 218a-c corresponding to word x, $w_y$ is the portion of the initial factorized entropy matrix associated with matrix 218a-c for word y, and k is a partitioning coefficient 220 (described in greater detail below). As such, the entropies 216 may correspond to measures associated with whether a given word (e.g., word x) has been observed to and/or is expected to appear in a sentence with another word (e.g., wordy).

The entropies 216 include an entropy matrix 218a-c for each of the narratives 202a-c. The entropy matrices 218a-c are generally amendable to further analysis by the model generator 116. The word vector IDs 214 generally include for each word (or term) appearing in the subsets 210a-c, a corresponding vector (e.g., or set of numerical values). The vector for each word (or term) in the word vector IDs 214 generally corresponds to a count or frequency of a co-occurrence of the word (or term) with a set of other words and/or terms. For example, the vector for each word (or term) in the word vector IDs 214 may be based on a count of a number of co-occurrences of the word (or term) appearing in combination with another word (or term) (e.g., in the same sentence, within the same paragraph, within the same document, within a given number of words away). For example, the word vector IDs 214 may indicate that the term "peanut butter" has a vector of "0.95, 0.05, 0.75" where the value of "0.95" corresponds to the likelihood that the term "peanut butter" appears in a sentence with the word "the" (i.e., this is a very common combination of words/terms in a sentence), the value of "0.05" corresponds to the likelihood that the term "peanut butter" appears in a sentence with the word "dinosaur" (i.e., this is an uncommon combination of words to appear in a sentence), and the value of "0.75" corresponds to the likelihood that the term "peanut butter" appears in a sentence with the word "jelly" (i.e., this is a relatively common combination of words to appear in a sentence). The word vector IDs 214 may be previously determined by the narrative evaluator 112 using any appropriate information (e.g., a training set of example sentences). In some embodiments, the word vector IDs 214 are obtained from a third party (e.g., a data broker). Each entropy matrix 218a-c is generally a square matrix (e.g., where each dimension corresponds to the number of words of terms identified in the corresponding subset 210a-c) and includes the vector values for each word appearing in the corresponding subset 210a-c.

The vector IDs 214 may be used to replace the words or terms in the subsets 210a-c with a corresponding vector (e.g., a set of numbers). This initial matrix, which may be referred to as a factorized entropy matrix, thus may include, for each word in the subset 210a-c, a set of numbers. The numbers generally indicate a measure (e.g., a count, frequency, or the like) associated with whether a word or term in the subset 210a-c commonly appears in a sentence with another word. In order to generate a square (i.e., N×N) entropy matrix 218a-c, the initial factorized entropy matrix may be multiplied my its transpose (i.e., using matrix multiplication). This allows each entropy matrix 218a-c to include, for each word in the corresponding subset 210a-c, a measure associated with whether that the word tends to appear in a sentence with another word in the subset 210a-c.

Figure 2B:
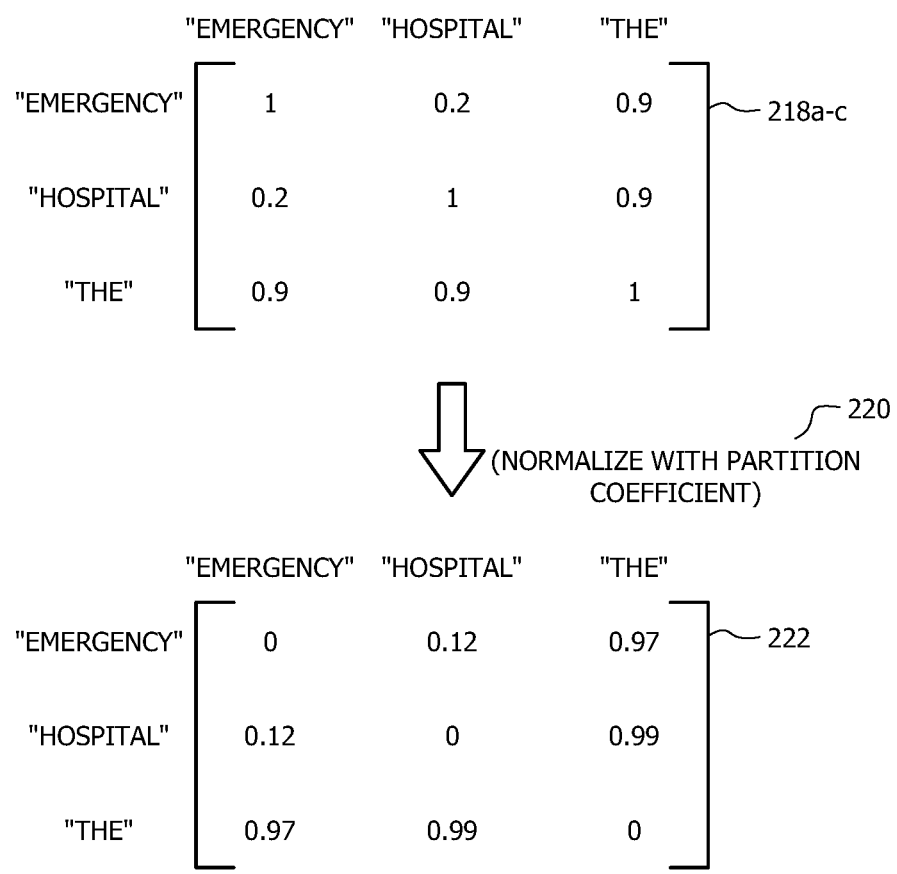
FIG. 2B is a flow diagram illustrating the determination of entropy matrices and normalized distances with respect to the flow of FIG. 2A.

FIG. 2B illustrates an example of a portion of an entropy matrix 218a-c, which includes numerical values associated with how frequently the example words "emergency," "hospital," and "the" have been observed to (e.g., and/or are expected to) appear in the same sentence. Values along the diagonal are all one (i.e., the entropy associated with a word appearing with itself in a sentence is 100%). This disclosure encompasses the recognition that, although this information is associated with how words appear in examples of natural language text, this information does not reflect the meanings of the words and provides limited utility on its own for evaluating the meaning of a narrative (e.g., one of the narratives 202a-c of FIG. 2A used to determine distances 114 and train the model generator 116).

Returning to FIG. 2A, the narrative evaluator 112 uses one or more partitioning coefficients 220 to transform the entropy matrices 218a-c into normalized distances 114. The normalized distances 114 may include word-to-word distances 222 (e.g., as also illustrated in FIGS. 3A-C) and/or narrative-to-word distances 224 (e.g., as illustrated by distances 408 in FIG. 4). As an example, in some embodiments, the normalized distance 114, which may also be referred to as a normalized factorized distance, between a first word or term, represented by x, and a second word or term, represented by y, may be determined as $$\text{Distance}(x, y) = \frac{\max\{w_x^2, w_y^2\} - w_x \cdot w_y}{k - \min\{w_x^2, w_y^2\}}$$

where $w_x$ is the portion of the initial factorized entropy matrix associated with matrix 218a-c corresponding to the word or term x, $w_y$ is the portion of the initial factorized entropy matrix associated with matrix 218a-c for the word or term y, and k is the partitioning coefficient 220. A matrix of distances 114 may be determined by normalizing for each entropy matrix 218a-c using diagonal terms of the matrix 218a-c and the partitioning coefficient 220. For instance, each term in a matrix of distances 114 may be determined using a corresponding term from an entropy matrix 218a-c, a constant portioning coefficient 220, and two corresponding diagonal terms from the entropy matrix 218a-c. Therefore, as an example, the $a^{th}$ column and $b^{th}$ row of a matrix of distances 114 is determined from the term at the $a^{th}$ column and $b^{th}$ row of the corresponding entropy matrix 218a-c, the term at the $a^{th}$ column and $a^{th}$ row of the corresponding entropy matrix 218a-c, the term at the $b^{th}$ column and $b^{th}$ row of the corresponding entropy matrix 218a-c, and the partitioning coefficient 220. The partitioning coefficient 220 is generally determined, or updated (e.g., at predefined intervals), based on determined distances 114 (e.g., previously determined distances 114) such that the largest value of the distances 114 does not exceed one. For instance, k may be determined as the value which, across all word pairs, the largest value of the Distance(x,y) is approximately one (see the equation for Distance(x,y) above).

Returning to FIG. 2B, a portion of the word-to-word distances 222 determined from the may include the values shown in the figure. The word-to-word distances 222 may be represented as a matrix, where the numerical values indicate the difference in the meanings of the various words shown in FIG. 2B. The values along the diagonal of matrix of distances 222 are zero because there is no difference in meaning between a word and itself. As another example, the word-to-word distance 222 value of "0.12" between "emergency" and "hospital" is relatively low reflecting that these words have overlapping meaning (e.g., because an individual may seek out or visit a hospital in the case of certain emergencies). This relationship between the words "emergency" and "hospital" is not effectively captured by the entropy matrices 218a-c illustrated in FIG. 3 (e.g., because the words "emergency" and "hospital" do not necessarily appear together at a high frequency in example sentences even though the words are related).

The word-to-word differences 222 between the word "the" and the words "emergency" and "hospital" are relatively large (e.g., near one in this example), indicating that these words have different meanings (e.g., with limited overlap in meaning). For further illustration, FIGS. 3A-C show tables 300, 310, and 320 of other example word-to-word distances 306, 316, 326 between different words 302, 312, 324 and the sets of words 304, 314, 324. For instance, FIG. 3A shows that the distance 306 between the word 302 "brother" and the word 304 "she" is about 0.087. Meanwhile, FIG. 3B shows that the distance 316 between the word 312 "hospital" and the word 314 "she" is about 0.12, and FIG. 3C shows that the distance 326 between the word 322 "running" and the word 324 "she" is about 0.11.

Returning to FIG. 2A, the narrative-to-word distances 224 generally reflects the difference in meaning of a narrative 202a-c and a given word. For example, the narrative-to-word distances 224 may represent the smallest difference in meaning of a given word and any word in the narrative 204a-c. FIG. 4 illustrates an example of the narrative-to-word distances 224 of FIG. 2. In this example, a narrative 402 describes an interaction between a service provider and a client. Narrative 402 may be one of the narratives 202a-c of FIG. 2 and/or one of the narratives 104a-c, 108 of FIG. 1. As shown in this example, the narrative 402 includes several typos, spelling errors, and grammatical errors. The narrative evaluator 112 of this disclosure is particularly suited to evaluate even such narratives 402, which include a number of errors. This may be facilitated, for instance, by the determination of the subset 404 of the narrative 404. The subset 404 may correspond to one of the subsets 210a-c of FIG. 2A. The narrative-to-word distances 408 correspond to the difference in meaning between a given word 410 (in this example, word 410 is "hospital") and the other words 406 in the narrative 402 (e.g., or in the retained subset 404 of the narrative 402). In this example, the narrative-to-word distance 224 for narrative 402 is the smallest distance 408 between the given word 410 "hospital" and the word 408 "care."

Returning to FIG. 2A, the model generator 116 may use the distances 114 to identify words 228, 234, 240 and corresponding thresholds 230a,b, 236a,b, 242a,b that are associated with predefined outcomes 204a,b, as illustrated by the dashed lines in FIG. 2A. For instance, the combination of word 228 and threshold 230a is associated with the first outcome 204a, while the combination of word 228 and the threshold 230b is associated with the second outcome 204b. In other words, the model generator 116 determines that the first word 228, when paired with the first threshold 230a, indicates the first outcome 204a is likely to be associated with a narrative 202a-c containing this word 228 when the narrative-to-word distance 224 between the word 228 and the narrative 202a-c is less than the threshold 230a. In a similar manner, a second word 234 is associated with the first outcome 204a via threshold 236a and to the second outcome 204b via threshold 236b, and the third word 240 is associated with the first outcome 204a via threshold 242a and to the second outcome 204b via threshold 242b.

In some cases, as illustrated in FIG. 2A, the model generator 116 may identify weights 232a,b, 238a,b, and 244a,b for the different combinations of words 228, 234, 240 and thresholds 230a,b, 236a,b, 242a,b. As described in greater detail below with respect to FIG. 6, weights 232a,b, 238a,b, and 244a,b may be used to generate weighted scores for new narratives (e.g., narratives 104a-c) that are analyzed using the narrative evaluator 112. The model generator 116 may determine the corresponding weight 232a,b, 238a,b, and 244a,b for each of the pairs of words 228, 234, 240 and thresholds 230a,b, 236a,b, 242a,b. Each weight 232a,b, 238a,b, and 244a,b generally indicates a relative extent to which the corresponding pair of words and thresholds suggests that a narrative 202a-c described an unapproved event. For instance, certain words 228, 234, 240 may be known to be commonly occurring and are given a relatively low weight 232a,b, 238a,b, and 244a,b, while other words, which may be identified as rarer and/or more often associated with a particular event of interest may be given a larger weight 232a,b, 238a,b, and 244a,b. As described in greater detail below with respect to FIG. 6, the narrative evaluator 112 may use the weights 232a,b, 238a,b, and 244a,b to generate weighted scores for a new narrative (e.g., a narrative 204a-c) that has been received for analysis.

The example model generator 116 illustrated in FIG. 2A includes a word and threshold tester 226 which is used to determine the particular pairs of words 228, 234, 240 and thresholds 230a,b, 236a,b, 242a,b that are linked to the outcomes 204a,b of interest (as indicated by the dashed lines in FIG. 2A and described above). In some embodiments, the word and threshold tester 226 employs artificial intelligence or machine learning (e.g., a convolutional neural network) to determine the unique pairs of words 228, 234, 240 and thresholds 230a,b, 236a,b, 242a,b that are associated with outcomes 204a,b. In some embodiments, rather than testing all words in a given narrative 202a-c (or subset 210a-c), a set of words may be predetermined to test using the word and threshold tester 226. For instance, a set of words may be previously associated with a statute or law that is of interest to an administrator of the data sources 102a-c of FIG. 1.

Figure 5:
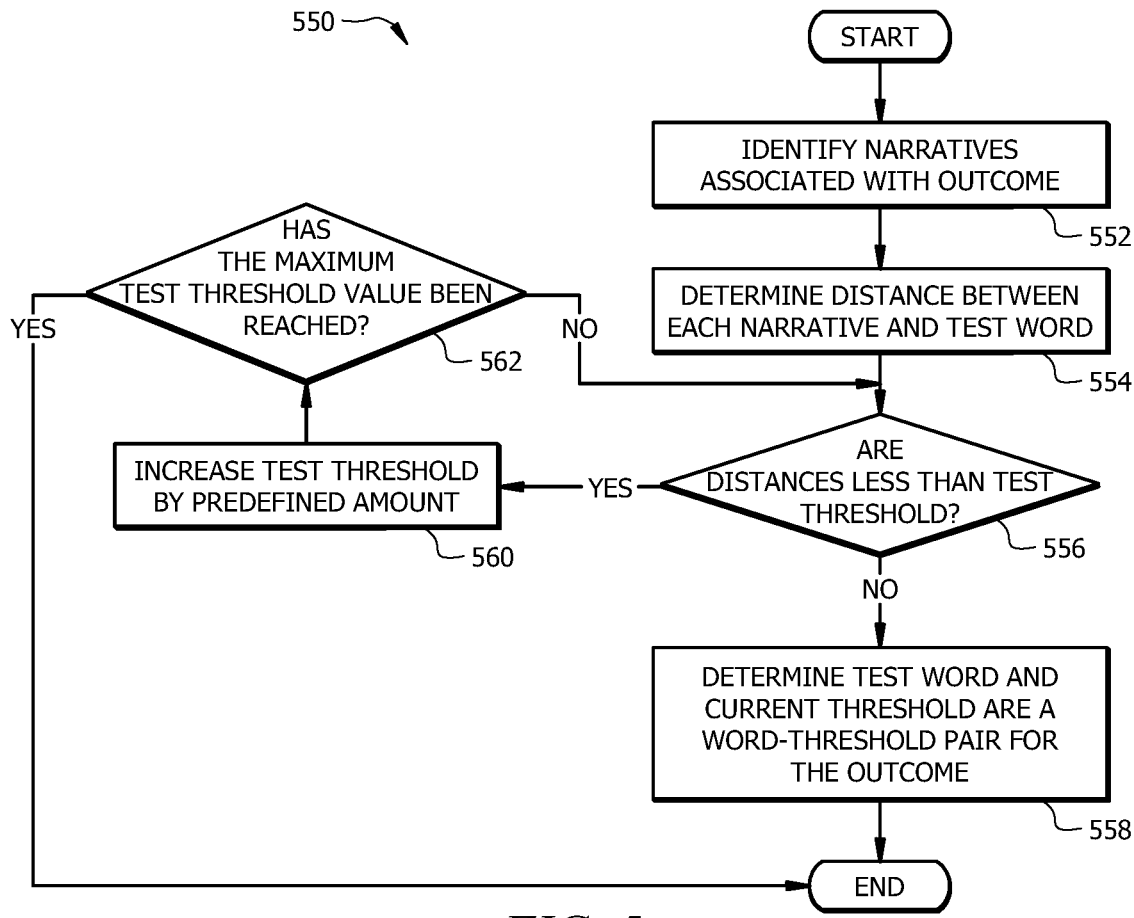
FIG. 5 is a flowchart illustrating an example method of determining word-threshold pairs for use by the narrative evaluator of the system of FIG. 1.

Example operation of the word and threshold tester 226 is described in greater detail with respect to FIG. 5, which illustrates an example method 500 of operating the word and threshold tester 226. Method 500 may start at step 502 where narratives 202a-c associated with particular outcomes 204a-c are identified. For instance, the word and threshold tester 226 may determine that a plurality of narratives 202a are associated with outcome 204a. For instance, multiple narratives 202a may have been previously found to describe an unapproved event (e.g., an event associated with violating a statute, harming an individual, or the like).

At step 504, a narrative-to-word distance 224 is determined between each of the narratives 202a identified at step 502 and a test word (e.g., one of the words 228, 234, 240, or any other word(s) tested to see if they are associated with an outcome 204a,b). As described above with respect to FIG. 2A and FIG. 4, the narrative-to-word distance 224 generally corresponds to a difference in meaning between the narrative and the test word. At step 506, the word and threshold tester 226 determines whether each (e.g., or at least a threshold number) of the distances 224 determined at step 504 are less than an initial test threshold value.

If the criteria are satisfied at step 506, the word and threshold tester 226 determines, at step 508, that the tested word and the initial threshold are a word-threshold pair (e.g., word-threshold pair 118a,b) associated with the outcome (e.g., outcome 124a,b). If, at step 506, the criteria are not satisfied, the test threshold value may be increased (e.g., by a predetermined amount) at step 510. As long as the increased threshold value is not greater than a maximum value (see step 512), the word and threshold tester 226 may reevaluate whether the criteria of step 506 are satisfied using the increased threshold. This may be repeated until either the criteria are satisfied at step 506 and the word-threshold pair is determined at step 508 or the maximum threshold value is exceeded at step 512 and the method 500 ends.

Detecting Narrative for an Unapproved Event

Figure 6:
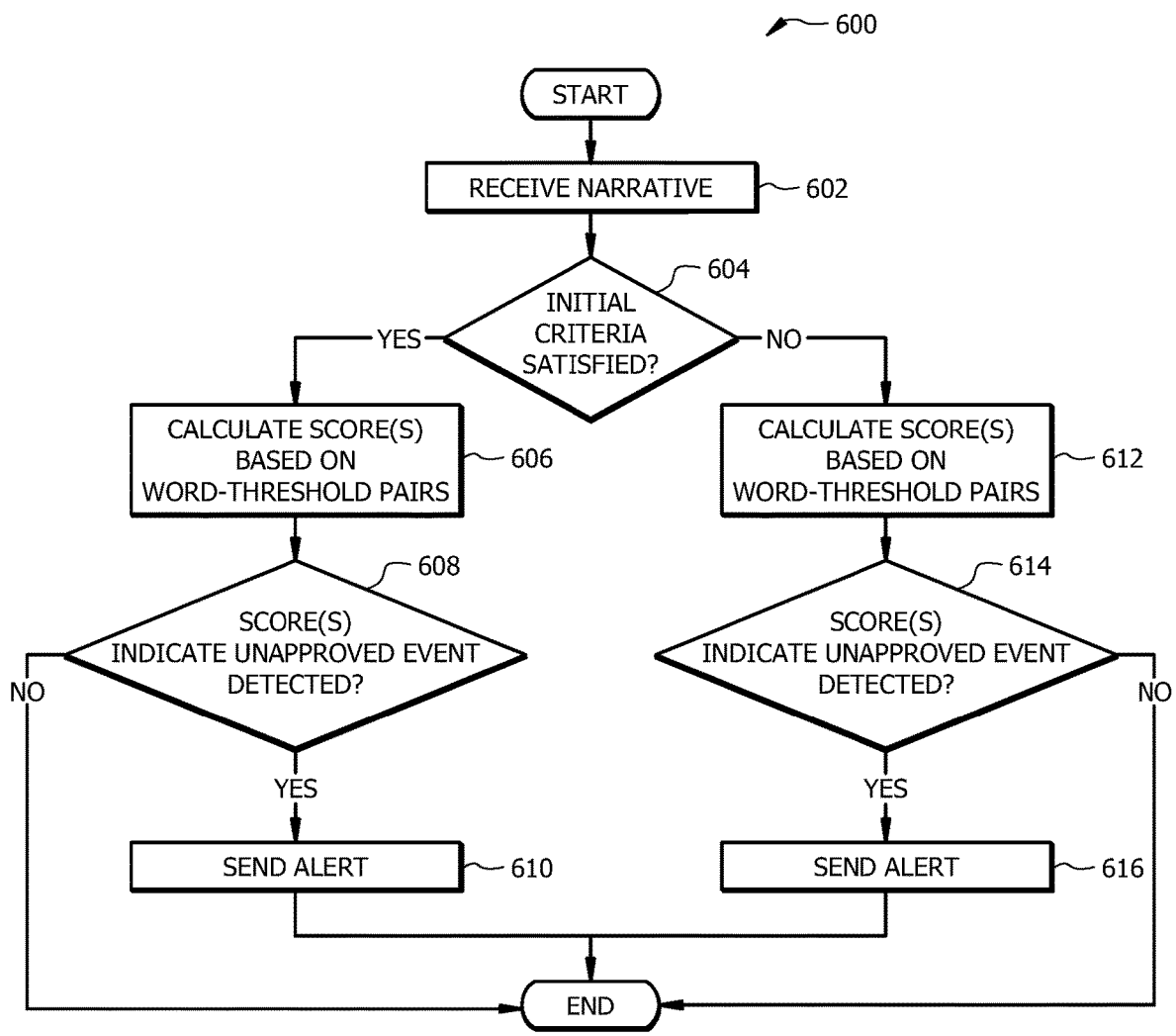
FIG. 6 is a flowchart illustrating an example method of evaluating a narrative using the system of FIG. 1.

FIG. 6 is a flowchart of an example method 600 for determining that a narrative 104a-c is associated with an unapproved event. The narrative evaluator 112 of FIG. 1 may implement method 600. The method 600 generally facilitates not only the detection of narratives 104a-c describing unapproved events but also the generation of a corresponding alert 128, which identifies the narrative 104a-c and the unapproved event. Method 600 may begin at step 602 where narrative 104a-c is received by the narrative evaluator 112. For instance, a user (e.g., a service provider) may write a narrative 104a-c and submit it for evaluation by the narrative evaluator 112.

At step 604, the narrative evaluator 112 may determine whether initial criteria are satisfied for the narrative 104a-c. For instance, the narrative evaluator 112 may determine whether the narrative 104a-c satisfies certain statutory and/or legal requirements for possibly describing an event requiring reporting within a limited time frame (e.g., an event that violates a statute or law). For instance, the narrative evaluator 112 may determine whether a client described in the narrative 104a-c is within a predefined age range, is associated with a predefined account type, or the like.

If the criteria are met at step 604, the narrative evaluator 112 may determine one or more scores for the narrative 104a-c using at least one of the word-threshold pairs 118a,b. For example, referring to the examples of FIGS. 1 and 2, the score may reflect an extent that a narrative-to-word distance 224 between the received narrative 104*a-c* and a word 120*a,b* is different than the threshold distance 122*a,b*. For example, the score may be the narrative-to-word distance 224 (see FIG. 2) between the received narrative 104*a-c* and the word 120*a,b* (e.g., as determined as described with respect to FIG. 2 above). In some cases, a plurality of scores may be determined. In some embodiments, the score may be a weighted (e.g., using weights 232*a,b*, 238*a,b*, 244*a,b* of FIG. 2) to determine a weighted score. For example, referring to the example of FIG. 2, a score may be determined for outcome 204*a* by weighting a narrative-to-word distance 224 calculated for the first word 228 using weight 232*a*, for the second word 234 using weight 238*a*, and/or for the third word 240 using weight 244*a*.

At step 608, the narrative evaluator 112 determines whether the new narrative 104*a-c* includes text associated with a particular event or outcome 110 by determining whether score(s) determined at step 606 indicate that a predefined outcome 124*a,b* is detected (e.g., an outcome 124*a,b* associated with an unapproved event). For example, the narrative evaluator 112 may determine whether the score(s) from step 606 are within a threshold range (e.g., a range defined by thresholds 122*a,b*). For instance, the threshold range may include values less than the threshold value 122*a,b*. Thus, if narrative-to-word distance 224 (see FIG. 2) between the received narrative 104*a-c* and the word 120*a,b* is less than the corresponding threshold 122*a,b*, the unapproved event associated with the outcome 124*a,b* may be detected, and method 600 proceeds to step 610. Otherwise, the event is generally not detected, and method 600 ends.

At step 610, an alert is provided to the administrator device 126. The alert 128 may include a description of the event detected at step 608. For instance, the alert 128 may be appropriately formatted as a report for notifying an administrative body associated with the administrator device 126 and may indicate, using appropriate language, that the detected event may have occurred.

If the criteria are not satisfied at step 604, the narrative evaluator 112 may proceed through a series of steps 612, 614, and 616 similar to steps 606, 608, and 610 described above, where steps 612, 614, and 616 are configured to detect and report events not associated with a particular statute, law, or rule. For example, if the criteria are not satisfied at step 604, the narrative evaluator 112 may require more stringent criteria at step 614 and/or may provide a less urgent alert 128 at step 616. For instance, if the initial criteria not being satisfied at step 604 indicates that the event described in the received narrative 104*a-c* is not associated with a statute being violated or the like, an alert 128 may only be provided at step 616 if more stringent criteria are satisfied at step 614 for determining that a high-priority unapproved event is detected at step 614. For example, at step 612, the narrative evaluator may proceed to calculate scores in the same or similar manner to that described above for step 606. At step 614, the narrative evaluator 112 determines whether the score(s) determined at step 606 indicate that a predefined outcome 124*a,b* is detected (e.g., an outcome 124*a,b* associated with an unapproved event). Generally at step 614, more stringent threshold criteria are used (when the initial criteria were not satisfied at step 604) than at step 608 (when the initial criteria were satisfied at step 604). At step 616, an alert 128 is provided to the administrator device 126. The alert 128 provided at step 616 may indicate further review is needed to identify if an event which is high-priority but not necessarily involving rapid reporting may be associated with the received narrative 104*a-c*.

Example Device

Figure 7:
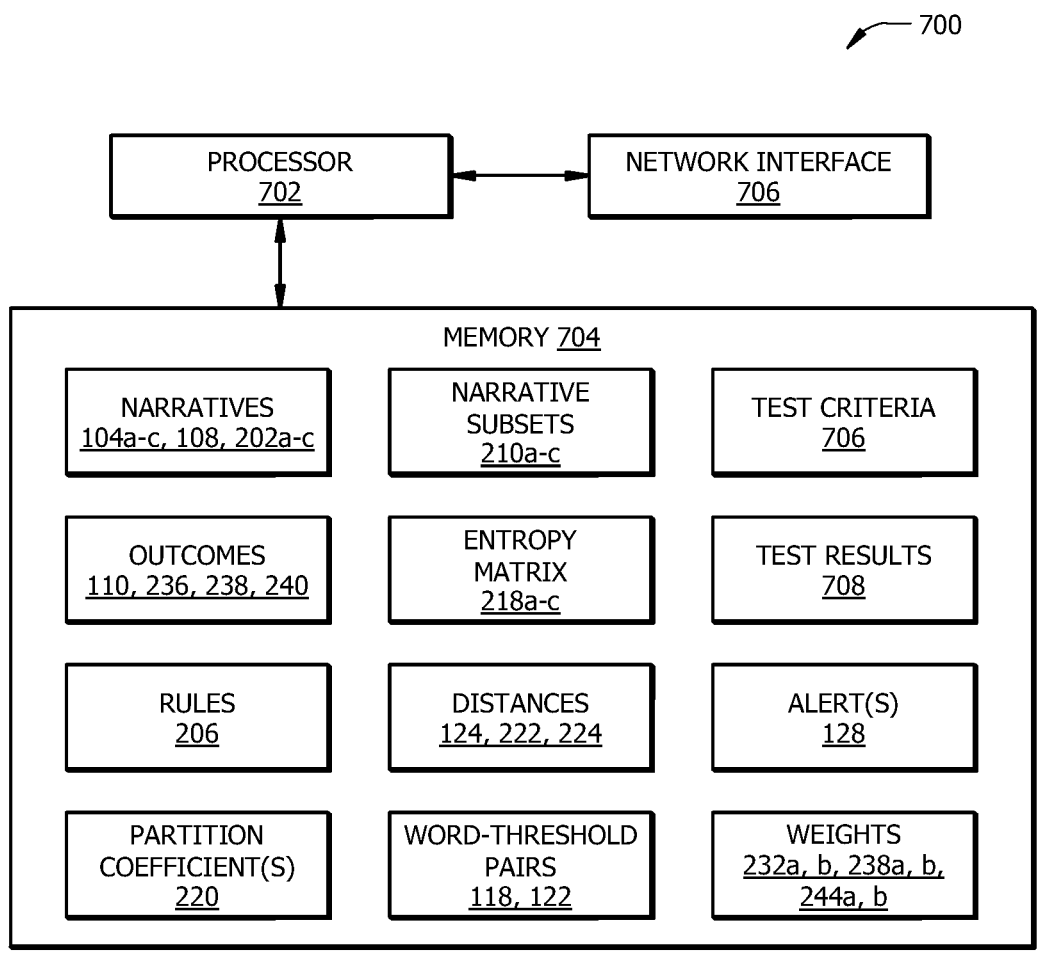
FIG. 7 is a diagram of an example device configured to implement the system of FIG. 1.

FIG. 7 is an embodiment of a device 700 configured to implement the system 100. The device 700 includes a processor 702, a memory 704, and a network interface 706. The device 700 may be configured as shown or in any other suitable configuration. The device 700 may be and/or may be used to implement data sources 102*a-c*, narrative repository 106, narrative evaluator 112, and the administrator device 126 of FIG. 1.

The processor 702 comprises one or more processors operably coupled to the memory 704. The processor 702 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 702 may be a programmable logic device, a microcontroller, a microprocessor, or any suitable combination of the preceding. The processor 702 is communicatively coupled to and in signal communication with the memory 704 and the network interface 706. The one or more processors are configured to process data and may be implemented in hardware or software. For example, the processor 702 may be 8-bit, 16-bit, 32-bit, 64-bit or of any other suitable architecture. The processor 702 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute instructions to implement the function disclosed herein, such as some or all of approach described with respect to the flow diagram 200 and method 600. In an embodiment, the function described herein is implemented using logic units, FPGAs, ASICs, DSPs, or any other suitable hardware or electronic circuitry.

The memory 704 is operable to store narratives 104*a-c*, 108, 202*a-c*, outcomes 110, 124*a,b*, 230, 238, 240, rules 208, partitioning coefficient(s) 220, narrative subsets 210*a-c*, entropy matrices 218*a-c*, distances 114, 222, 224, word-threshold pairs 118*a,b*, test criteria 706, test results 708, alert(s) 128, weights 232*a,b*, 238*a,b*, 244*a,b*, and any other data, instructions, logic, rules, or code operable to execute the function described herein. The test criteria 706 may be used to implement step 604 of method 600 (see FIG. 6 and corresponding description above). The test results 708 may be results generated by the word and threshold tester 226 of the model generator 116 (see FIG. 2 and corresponding description above). The test results 708 may include the scores calculated by the narrative evaluator 112 in order to determine whether a given narrative 104*a-c* is associated with a predefined outcome 124*a,b* (see FIG. 6, steps 608 and 614, and corresponding description above). The memory 704 comprises one or more disks, tape drives, or solid-state drives, and may be used as an over-flow data storage device, to store programs when such programs are selected for execution, and to store instructions and data that are read during program execution. The memory 704 may be volatile or non-volatile and may comprise read-only memory (ROM), random-access memory (RAM), ternary contentaddressable memory (TCAM), dynamic random-access memory (DRAM), and static random-access memory (SRAM).

The network interface 706 is configured to enable wired and/or wireless communications. The network interface 706 is configured to communicate data between the device 700 and other network devices, systems, or domain(s). For example, the network interface 706 may comprise a WIFI interface, a local area network (LAN) interface, a wide area network (WAN) interface, a modem, a switch, or a router. The processor 702 is configured to send and receive data using the network interface 706. The network interface 706 may be configured to use any suitable type of communication protocol as would be appreciated by one of ordinary skill in the art.

While several embodiments have been provided in this disclosure, it should be understood that the disclosed systems and methods might be embodied in many other specific forms without departing from the spirit or scope of this disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of this disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

What is claimed is:

1. A system comprising:
a narrative repository configured to store a plurality of narratives and, for each narrative, a corresponding outcome, wherein each narrative comprises a natural language description of characteristics associated with an event and the corresponding outcome for each narrative comprises an indication of whether the event was unapproved and required reporting to an administrative entity; and
a narrative evaluator communicatively coupled to the narrative repository, the narrative evaluator comprising a processor configured to:
receive the plurality of narratives and the outcome for each narrative;
for each received narrative, determine a subset of the narrative to retain based on predefined rules, wherein the predefined rules identify information to exclude from the narrative;
for each determined subset, determine a factorized entropy matrix comprising for each word in the subset a set of numbers, wherein each number is associated with a count of co-occurrences of the word with another word in the natural language;
for each factorized entropy matrix, determine an entropy matrix by multiplying the factorized entropy matrix by a transpose of the factorized entropy matrix, the entropy matrix comprising, for each word in the subset, a measure associated with whether the word is expected to appear in a sentence with another word in the subset;
for each entropy matrix, determine a distance matrix by normalizing the entropy matrix using a partitioning coefficient, wherein the distance matrix comprises for each word in the subset, a numerical representation of a difference in the meaning of the word and another word;
determine, using at least one of the distance matrices, for a first word of the subset, a first threshold distance, wherein, when a first narrative-to-word distance determined between a first narrative and the first word is less than the threshold distance, text in the first narrative is determined to be associated with a first outcome corresponding to an occurrence of an unapproved event, wherein the first narrative-to-word difference corresponds to a smallest difference between a meaning of the first word and a meaning of any word in the first narrative; and
store the first word and first threshold as a first word-threshold pair associated with the first outcome.

2. The system of claim 1, the processor further configured to determine, for the first word of the subset, the first threshold distance by:
identifying a plurality of narratives containing the first word and associated with the first outcome;
for each of the identified narratives, determining a narrative-to-word distance between the narrative and the first word;
determining whether each of the narrative-to-word distances is less than a test threshold value;
in response to determining that each of the narrative-to-word distances is less than a test threshold value, determining that the test threshold value is the first threshold distance;
in response to determining that each of the narrative-to-word distances is not less than a test threshold value:
increasing the test threshold by a predefined amount; and
in response to determining that each of the narrative-to-word distances is less than the increased test threshold value, determining that the increased test threshold value is the first threshold distance.

3. The system of claim 1, the processor further configured to use a convolutional neural network in order to determine, for the first word of the subset, the first threshold distance.

4. The system of claim 1, the processor further configured to:
determine, using at least one of the distance matrices, for a second word of the subset, a second threshold distance;
determine, using at least one of the distance matrices, for a third word of the subset, a third threshold distance;
store the second word and second threshold as a second word-threshold pair associated with the first outcome;
store the third word and third threshold as a third word-threshold pair associated with the first outcome;
determine a corresponding weight for each of the first, second, and third word-threshold pairs, each weight indicating a relative extent to which the corresponding word-threshold pair indicates that the unapproved event has occurred, wherein the weights comprise a first weight for the first word-threshold pair, a second weight for the second word-threshold pair, and a third weight for the third word-threshold pair;

receive, from a data source, a new narrative, the new narrative comprising a new natural language description of a first event;

determine a weighted score for the new narrative based on a first narrative-to-word distance between the new narrative and the first word weighted by the first weight, a second narrative-to-word distance between the new narrative and the second word weighted by the second weight, and a third narrative-to-word distance between the new narrative and the third word weighted by the third weight; and in response to determining that the score is within a threshold range, automatically provide an alert to an administrator device, the alert comprising a description of the first event.

5. The system of claim 1, the processor further configured to:

receive, from a data source, a new narrative, the new narrative comprising a new natural language description of a first event;

determine, using the first word-threshold pair, whether the new narrative includes text associated with the first outcome; and in response to determining that the new narrative includes text associated with the first outcome, automatically provide an alert to an administrator device, the alert comprising a description of the first event.

6. The system of claim 5, the processor further configured to determine whether the new narrative includes text associated with the first outcome by:

determining a narrative-to-word distance between the new narrative and the first word; and determining that the narrative-to-word distance is less than the first threshold distance.

7. The system of claim 5, the processor further configured to, prior to determining whether the new narrative includes text associated with the first outcome:

determine whether initial criteria are satisfied for the narrative; and if the initial criteria are not satisfied, determine that the new narrative does not include text associated with the first outcome; and if the initial criteria are satisfied, proceed with determining whether the new narrative includes text associated with the first outcome.

8. A method comprising:

receiving a plurality of narratives and an outcome for each narrative from a narrative repository, wherein the narrative repository is configured to store the plurality of narratives and, for each narrative, the corresponding outcome, wherein each narrative comprises a natural language description of characteristics associated with an event and the corresponding outcome for each narrative comprises an indication of whether the event was unapproved and required reporting to an administrative entity;

for each received narrative, determining a subset of the narrative to retain based on predefined rules, wherein the predefined rules identify information to exclude from the narrative;

for each determined subset, determining a factorized entropy matrix comprising for each word in the subset a set of numbers, wherein each number is associated with a count of co-occurrences of the word with another word in the natural language;

for each factorized entropy matrix, determining an entropy matrix by multiplying the factorized entropy matrix by a transpose of the factorized entropy matrix, the entropy matrix comprising, for each word in the subset, a measure associated with whether the word is expected to appear in a sentence with another word in the subset;

for each entropy matrix, determining a distance matrix by normalizing the entropy matrix using a partitioning coefficient, wherein the distance matrix comprises for each word in the subset, a numerical representation of a difference in the meaning of the word and another word;

determining, using at least one of the distance matrices, for a first word of the subset, a first threshold distance, wherein, when a first narrative-to-word distance determined between a first narrative and the first word is less than the threshold distance, text in the first narrative is determined to be associated with a first outcome corresponding to an occurrence of an unapproved event, wherein the first narrative-to-word difference corresponds to a smallest difference between a meaning of the first word and a meaning of any word in the first narrative; and storing the first word and first threshold as a first word-threshold pair associated with the first outcome.

9. The method of claim 8, the method further comprising determining, for the first word of the subset, the first threshold distance by:

identifying a plurality of narratives containing the first word and associated with the first outcome;

for each of the identified narratives, determining a narrative-to-word distance between the narrative and the first word;

determining whether each of the narrative-to-word distances is less than a test threshold value;

in response to determining that each of the narrative-to-word distances is less than a test threshold value, determining that the test threshold value is the first threshold distance;

in response to determining that each of the narrative-to-word distances is not less than a test threshold value:

increasing the test threshold by a predefined amount; and in response to determining that each of the narrative-to-word distances is less than the increased test threshold value, determining that the increased test threshold value is the first threshold distance.

10. The method of claim 8, the method further comprising using a convolutional neural network in order to determine, for the first word of the subset, the first threshold distance.

11. The method of claim 8, the method further comprising:

determining, using at least one of the distance matrices, for a second word of the subset, a second threshold distance;

determining, using at least one of the distance matrices, for a third word of the subset, a third threshold distance;

storing the second word and second threshold as a second word-threshold pair associated with the first outcome;

storing the third word and third threshold as a third word-threshold pair associated with the first outcome;

determining a corresponding weight for each of the first, second, and third word- threshold pairs, each weight indicating a relative extent to which the corresponding word-threshold pair indicates that the unapproved event has occurred, wherein the weights comprise a first weight for the first word-threshold pair, a second weight for the second word-threshold pair, and a third weight for the third word-threshold pair;

receiving, from a data source, a new narrative, the new narrative comprising a new natural language description of a first event;

determining a weighted score for the new narrative based on a first narrative-to-word distance between the new narrative and the first word weighted by the first weight, a second narrative-to-word distance between the new narrative and the second word weighted by the second weight, and a third narrative-to-word distance between the new narrative and the third word weighted by the third weight; and in response to determining that the score is within a threshold range, automatically providing an alert to an administrator device, the alert comprising a description of the first event.

12. The method of claim 8, the method further comprising:

receiving, from a data source, a new narrative, the new narrative comprising a new natural language description of a first event;

determining, using the first word-threshold pair, whether the new narrative includes text associated with the first outcome; and in response to determining that the new narrative includes text associated with the first outcome, automatically providing an alert to an administrator device, the alert comprising a description of the first event.

13. The method of claim 12, the method further comprising determining whether the new narrative includes text associated with the first outcome by:

determining a narrative-to-word distance between the new narrative and the first word; and determining that the narrative-to-word distance is less than the first threshold distance.

14. The method of claim 12, the method further comprising, prior to determining whether the new narrative includes text associated with the first outcome:

determining whether initial criteria are satisfied for the narrative; and if the initial criteria are not satisfied, determining that the new narrative does not include text associated with the first outcome; and if the initial criteria are satisfied, proceeding with determining whether the new narrative includes text associated with the first outcome.

15. A device comprising:

a memory configured to store a narrative repository, the narrative repository comprising a plurality of narratives and, for each narrative, a corresponding outcome, wherein each narrative comprises a natural language description of characteristics associated with an event and the corresponding outcome for each narrative comprises an indication of whether the event was unapproved and required reporting to an administrative entity; and a processor communicatively coupled to the memory, the processor configured to:

receive the plurality of narratives and the outcome for each narrative;

for each received narrative, determine a subset of the narrative to retain based on predefined rules, wherein the predefined rules identify information to exclude from the narrative;

for each determined subset, determine a factorized entropy matrix comprising for each word in the subset a set of numbers, wherein each number is associated with a count of co-occurrences of the word with another word in the natural language;

for each factorized entropy matrix, determine an entropy matrix by multiplying the factorized entropy matrix by a transpose of the factorized entropy matrix, the entropy matrix comprising, for each word in the subset, a measure associated with whether the word is expected to appear in a sentence with another word in the subset;

for each entropy matrix, determine a distance matrix by normalizing the entropy matrix using a partitioning coefficient, wherein the distance matrix comprises for each word in the subset, a numerical representation of a difference in the meaning of the word and another word;

determine, using at least one of the distance matrices, for a first word of the subset, a first threshold distance, wherein, when a first narrative-to-word distance determined between a first narrative and the first word is less than the threshold distance, text in the first narrative is determined to be associated with a first outcome corresponding to an occurrence of an unapproved event, wherein the first narrative-to-word difference corresponds to a smallest difference between a meaning of the first word and a meaning of any word in the first narrative; and store the first word and first threshold as a first word-threshold pair associated with the first outcome.

16. The device of claim 15, the processor further configured to determine, for the first word of the subset, the first threshold distance by:

identifying a plurality of narratives containing the first word and associated with the first outcome;

for each of the identified narratives, determining a narrative-to-word distance between the narrative and the first word;

determining whether each of the narrative-to-word distances is less than a test threshold value;

in response to determining that each of the narrative-to-word distances is less than a test threshold value, determining that the test threshold value is the first threshold distance;

in response to determining that each of the narrative-to-word distances is not less than a test threshold value:

increasing the test threshold by a predefined amount; and in response to determining that each of the narrative-to-word distances is less than the increased test threshold value, determining that the increased test threshold value is the first threshold distance.

17. The device of claim 15, the processor further configured to:

determine, using at least one of the distance matrices, for a second word of the subset, a second threshold distance;

determine, using at least one of the distance matrices, for a third word of the subset, a third threshold distance;

store the second word and second threshold as a second word-threshold pair associated with the first outcome;

store the third word and third threshold as a third word-threshold pair associated with the first outcome;

determine a corresponding weight for each of the first, second, and third word-threshold pairs, each weight indicating a relative extent to which the corresponding word-threshold pair indicates that the unapproved event has occurred, wherein the weights comprise a first weight for the first word-threshold pair, a second weight for the second word-threshold pair, and a third weight for the third word-threshold pair;

receive, from a data source, a new narrative, the new narrative comprising a new natural language description of a first event;

determine a weighted score for the new narrative based on a first narrative-to-word distance between the new narrative and the first word weighted by the first weight, a second narrative-to-word distance between the new narrative and the second word weighted by the second weight, and a third narrative-to-word distance between the new narrative and the third word weighted by the third weight; and in response to determining that the score is within a threshold range, automatically provide an alert to an administrator device, the alert comprising a description of the first event.

18. The device of claim 15, the processor further configured to:

receive, from a data source, a new narrative, the new narrative comprising a new natural language description of a first event;

determine, using the first word-threshold pair, whether the new narrative includes text associated with the first outcome; and in response to determining that the new narrative includes text associated with the first outcome, automatically provide an alert to an administrator device, the alert comprising a description of the first event.

19. The device of claim 18, the processor further configured to determine whether the new narrative includes text associated with the first outcome by:

determining a narrative-to-word distance between the new narrative and the first word; and determining that the narrative-to-word distance is less than the first threshold distance.

20. The device of claim 18, the processor further configured to, prior to determining whether the new narrative includes text associated with the first outcome:

determine whether initial criteria are satisfied for the narrative; and if the initial criteria are not satisfied, determine that the new narrative does not include text associated with the first outcome; and if the initial criteria are satisfied, proceed with determining whether the new narrative includes text associated with the first outcome.

\* \* \* \* \*